C. F. ELLIOTT.
Vehicle-Wheel.
No. 62,402.
Patented Feb. 26, 1867.
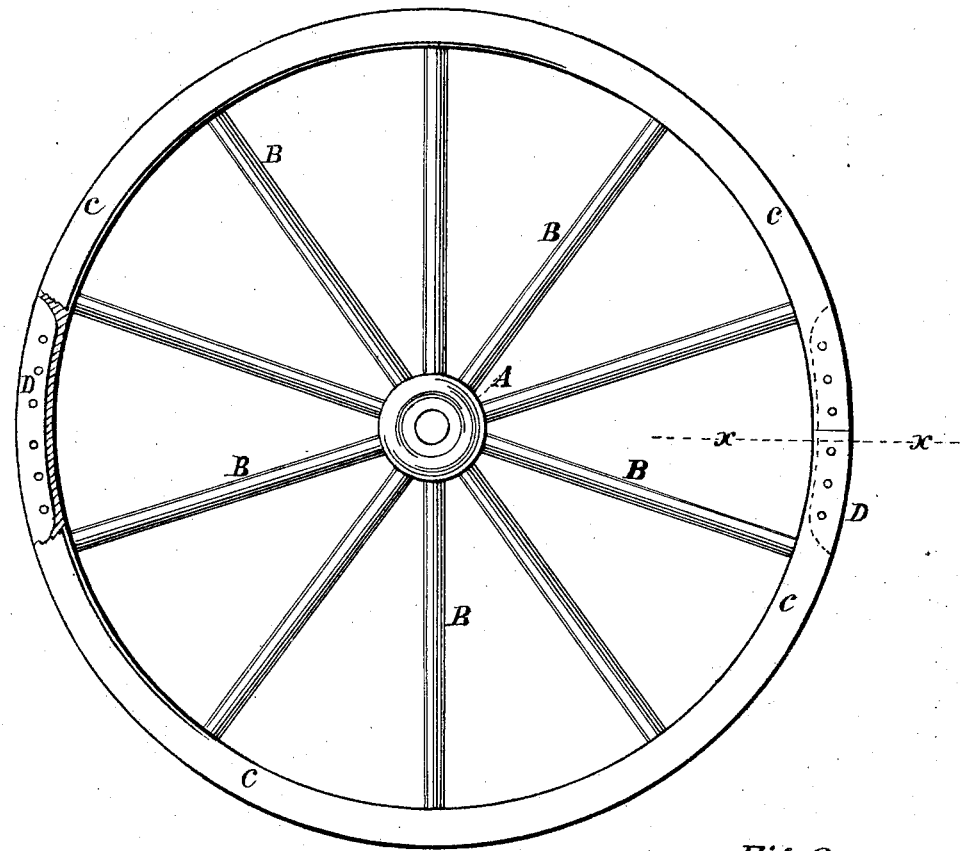
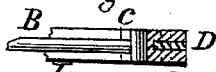

United States Patent Office.

CHARLES F. ELLIOTT, OF GREAT FALLS, NEW HAMPSHIRE, ASSIGNOR TO HIMSELF AND O. O. BENNETT.

Letters Patent No. 62,402, dated February 26, 1867.

IMPROVEMENT IN WHEELS FOR VEHICLES.

The Schedule referred to in these Letters Patent and making part of the same.

TO ALL WHOM IT MAY CONCERN:

Be it known that I, CHARLES F. ELLIOTT, of Great Falls, in the county of Strafford, and State of New Hampshire, have invented a new and useful Improvement in Wheel for Vehicles; and I do hereby declare that the following is a full, clear, and exact description thereof, which will enable others skilled in the art to make and use the same, reference being had to the accompanying drawings, forming part of this specification, in which—

Figure 1 is a side view of a wheel, part being broken away to show the form and position of the plate.

Figure 2 is a detail sectional view of the same taken through the line $x\,x$, fig. 1.

Similar letters of reference indicate like parts.

My invention has for its object to strengthen the wheel at the joints of the felloes and in other places to preserve its roundness and firmness; and it consists in the combination of a steel or other metal plate with the rim of the wheel, as hereinafter more fully described.

A is the hub; B are the spokes; and C are the felloes or rim of the wheel; D are plates, which are made of cast steel or other suitable metal. These plates are placed in slots or channels formed in the face of the rim C, of sufficient length and depth to receive the said plate D, the outer edge of which is made with the same curve as the curve of the rim C, so that when the said plate is inserted in its place, its said outer edge may be flush with the face of tread of the said rim. The plates D should be placed at every joint or point where the ends of felloes meet, and they may also be placed at other points between the spokes. These plates not only bind the parts of the rim together and give it firmness, but they also preserve its roundness by preventing the parts of the rim between the spokes from being driven in by use, and thus changing the form of a wheel from a circle to a polygon. A wheel made in accordance with my improvement is so firm and strong that the tire is no longer needed to bind the wheel together, and becomes simply a shoe to prevent the wear of the said rim. The plates D are secured in their places in the felloes or rim C, by bolts or rivets passed through the plates and through the said rim from side to side, as shown in figs. 1 and 2.

I claim as new, and desire to secure by Letters Patent—

Securing the felloes C to each other by means of the curved plates D, inserted and pivoted in channels, formed in the face or rim of said felloes, as herein set forth for the purpose specified.

CHARLES F. ELLIOTT.

Witnesses:
SAMUEL JAMES,
J. A. STICKNEY.